(12) United States Patent
Fukuda

(10) Patent No.: US 9,450,751 B2
(45) Date of Patent: Sep. 20, 2016

(54) SMART CARD, ELECTRONIC DEVICE, AND PORTABLE ELECTRONIC DEVICE

(71) Applicant: Kabushiki Kaisha Toshiba, Tokyo (JP)

(72) Inventor: Aki Fukuda, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/200,313

(22) Filed: Mar. 7, 2014

(65) Prior Publication Data

US 2014/0258726 A1    Sep. 11, 2014

(30) Foreign Application Priority Data

Mar. 8, 2013  (JP) ................. 2013-046542

(51) Int. Cl.
*H04L 29/00*   (2006.01)
*H04L 9/08*    (2006.01)
*G07F 7/10*    (2006.01)
*H04L 29/06*   (2006.01)
*G06F 7/12*    (2006.01)

(52) U.S. Cl.
CPC ........... *H04L 9/0877* (2013.01); *G07F 7/1016* (2013.01); *H04L 29/0619* (2013.01); *G06F 7/12* (2013.01); *H04L 29/06394* (2013.01)

(58) Field of Classification Search
CPC ........... G06Q 20/322; G06Q 20/3278; G06Q 20/3829; G07F 7/127; G07F 7/1016; G07F 7/12; H04L 9/0877; H04L 29/0619; H04L 29/06394
USPC ........................................ 173/172
See application file for complete search history.

(56) References Cited

U.S. PATENT DOCUMENTS

| 5,485,519 | A | | 1/1996 | Weiss |
| 5,708,422 | A | * | 1/1998 | Blonder et al. .............. 340/5.41 |
| 7,941,666 | B2 | * | 5/2011 | Kocher .......................... 713/172 |
| 8,649,768 | B1 | * | 2/2014 | Gaddam et al. .............. 455/411 |
| 2003/0005315 | A1 | * | 1/2003 | Horvat et al. ................. 713/189 |
| 2003/0210789 | A1 | * | 11/2003 | Farnham et al. .............. 380/270 |
| 2005/0015304 | A1 | * | 1/2005 | Evroni et al. .................. 705/26 |

(Continued)

FOREIGN PATENT DOCUMENTS

| JP | 04-256196 A | 9/1992 |
| JP | 2007-257544 A | 10/2007 |

(Continued)

OTHER PUBLICATIONS

Extended European Search Report issued in related European Patent Application No. 14158316.1 mailed on Jun. 5, 2014; 6 pages.
"ISO/IEC 7816-4: Interindustry command for interchange", Internet Citation, Sep. 1995, URL: www.ttfn.net/techno/smartcards/iso7816.html, 70 pages.

(Continued)

*Primary Examiner* — Don Zhao
(74) *Attorney, Agent, or Firm* — Baker Botts L.L.P.

(57) ABSTRACT

According to an embodiment, a smart card includes a communication section, a generation part, a first record section and an erasure section. The communication section transmits and receives data with the external device. The generation section generates a session key according to the command which is received by the communication section and requires generation of a session key. The first record section stores the session key generated by the generation section. The erasure section erases the session key when a holding period of the session key stored in the first record section exceeds a threshold.

14 Claims, 9 Drawing Sheets

(56) References Cited

U.S. PATENT DOCUMENTS

| | | | |
|---|---|---|---|
| 2005/0033692 A1* | 2/2005 | Jarman et al. | 705/41 |
| 2008/0275917 A1* | 11/2008 | Hochfield et al. | 707/200 |
| 2012/0144462 A1* | 6/2012 | Pochop, Jr. | 726/6 |

FOREIGN PATENT DOCUMENTS

| | | |
|---|---|---|
| KR | 20020031604 A | 3/2002 |
| KR | 20100112044 A | 10/2010 |
| WO | 2012/136986 A1 | 10/2012 |

OTHER PUBLICATIONS

Invitation to Respond to Written Opinion and Search Report issued in related Singapore Patent Application No. 10201400453U mailed Nov. 4, 2014, 11 pages.

Smart Card Alliance, "What Makes a Smart Card Secure?", A Smart Card Alliance Contactless and Mobile Payments Council White Paper (Oct. 2008).

Notice of Preliminary Rejection issued in related Korean Patent Application No. 10201424000, mailed Apr. 27, 2015 (10 pages with translation).

* cited by examiner

SMART CARD, ELECTRONIC DEVICE, AND PORTABLE ELECTRONIC DEVICE

CROSS-REFERENCE TO RELATED APPLICATION(S)

This application is based upon and claims the benefit of priority from the prior Japanese Patent Application No. 2013-046542, filed on Mar. 8, 2013, the entire contents of which are incorporated herein by reference.

FIELD

An embodiment of the present invention relates to a smart card, an electronic device, and a portable electronic device.

BACKGROUND

As for a smart card which is one of electronic devices, there is a smart card which generates a session key in order to execute a command from a processing device. Conventionally, the smart card holds the session key until an electric power source is shut off. Therefore, the smart card will hold the session key for a long time. t is not preferred from a viewpoint of security to hold a session key for a long time.

DETAILED EMBODIMENT

According to an embodiment, a smart card is provided with a communication section, a generation section, a first record section, and an erasing section. A communication section transmits a data to an external device, and receives a data from an external device. The generation section generates a session key according to a command which is received by the communication section and requires generation of a session key. The first record section stores the session key generated by the generation section. The erasure section erases the session key when a holding period of the session key stored in the first record section exceeds a threshold.

An electronic device concerning an embodiment establishes data communications with an external device, and operates according to a command transmitted from an external device. The external device transmits the command to the electronic device. The electronic device operates according to the received command, and transmits a response which stores an operation result etc. to the external device.

In order to execute the command from the external device, the electronic device needs to generate and store a session key before receiving the command. The electronic device can execute the received command when the electronic device receives the command which needs the session key from the external device while the session key is being stored.

Moreover, when a predetermined time passes after the electronic device generates the session key, the electronic device erases a session key. Even when the electronic device receives a command which needs the session key after erasing the session key, the electronic device cannot execute the received command.

Figure 1:
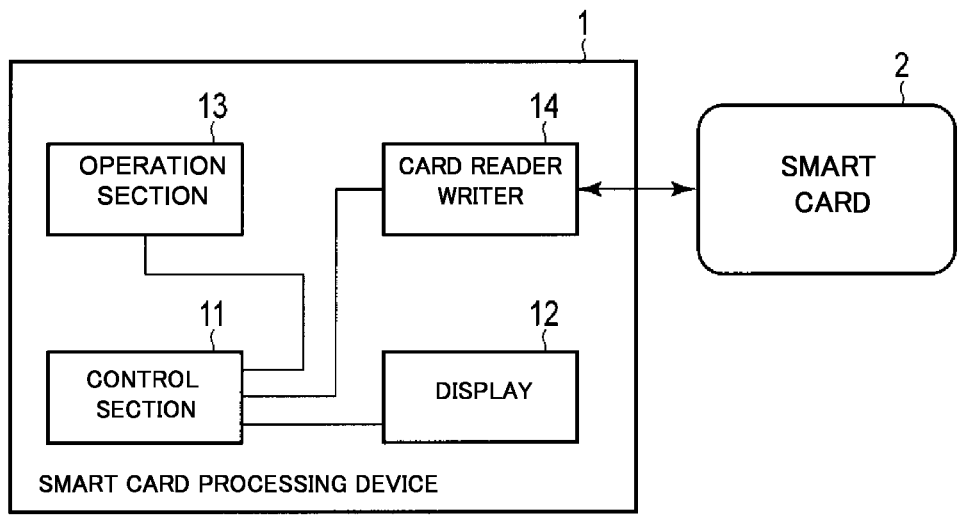
FIG. 1 is a block diagram showing a configuration example of a smart card processing system which has a smart card concerning an embodiment and a smart card processing device.

Hereinafter, an embodiment is explained in detail with reference to the drawings. FIG. 1 is a block diagram of a configuration example of a smart card processing system concerning the embodiment. The smart card processing system includes a smart card 2 as an electronic device, and an IC card processing device 1 as an external device which communicates with the smart card 2.

In the configuration example which FIG. 1 shows, the smart card processing device 1 includes a controller 11, a display 12, an operating section 13, a card reader-writer 14, etc. as fundamental composition. In addition, the smart card processing device 1 may possess a required element other than the elements shown in FIG. 1, or may except a specific element.

The controller 11 controls the operation of the smart card processing device 1 whole. The controller 11 includes a CPU, various memories, various interfaces, etc. The controller 11 may be composed of a personal computer (PC), for example. The controller 11 has a function to transmit a command to the smart card 2 by the card reader-writer 14, a function to perform various processing based on data of a response received from the smart card 2, etc. For example, by transmitting a write-in command containing data inputted by the operating section 13 or prescribed data to the smart card 2 via the card reader-writer 14, the controller 11 performs the control which requires write-in processing of the data concerned to the smart card 2.

The display 12 is a device to display various kinds of information by the control of the controller 11. The display 12 is a liquid crystal display monitor etc., for example. Various operating instructions, data, etc. are inputted into the operating section 13 by a user of the smart card processing device 1. The operating section 13 transmits the operating instructions, the data, etc. which were inputted to the controller 11. The operating sections 13 is a keyboard, a numeric keypad, a touch panel, etc., for example.

The card reader-writer 14 is an interface device for performing communication with the smart card 2. The card reader-writer 14 includes an interface according to a communication method of the smart card 2. The card reader-writer 14 includes a contact portion for physically and electrically connecting with a contact part of IC card 2, etc.

The card reader-writer 14 performs activation (starting) of the smart card 2, transmission of various commands, reception of a response to the command which the card reader-writer 14 transmitted, etc. based on the control by the controller 11.

Next, the smart card 2 is explained. The smart card 2 is supplied with electric power etc. from upper level devices such as the smart card processing device 1, and thereby is activated. That is, the smart card 2 is in a state where it can operate. For example, the smart card 2 receives an operation electric power and an operation clock from the smart card processing device 1 via the contact part as a communication interface, and is activated.

Figure 2:
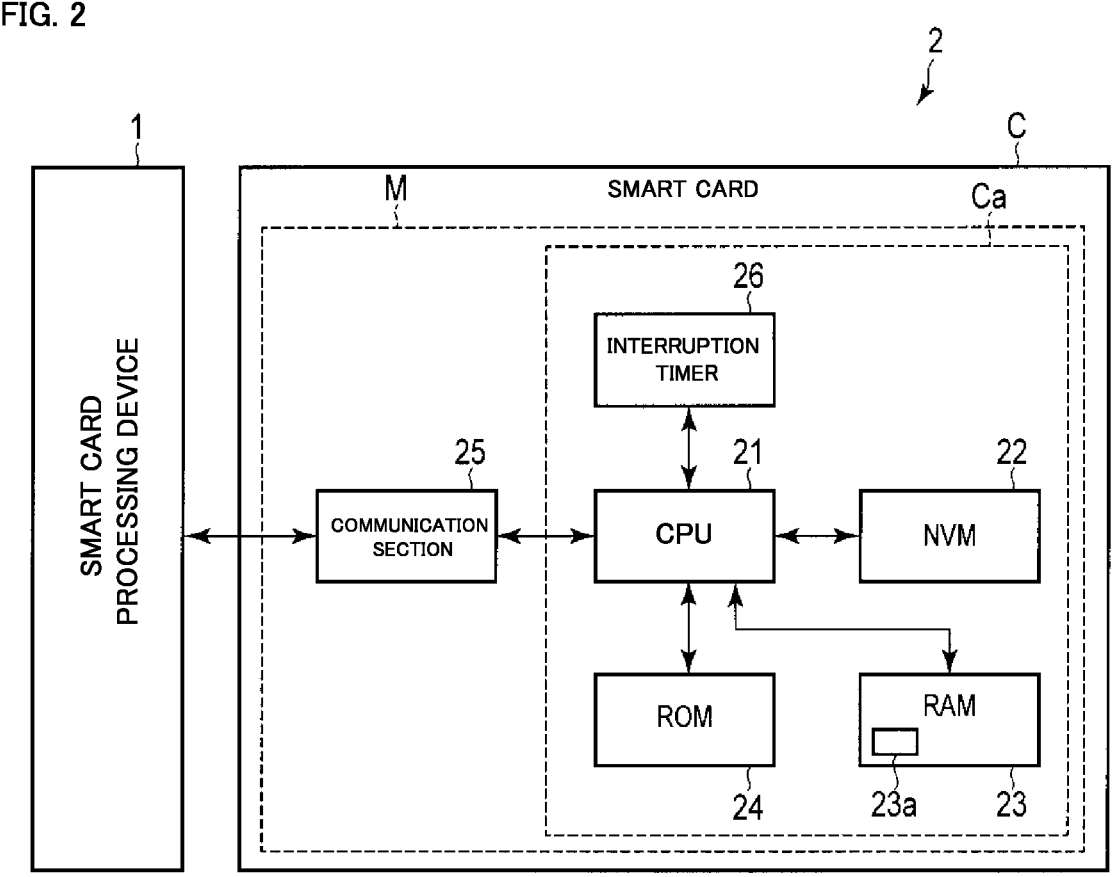
FIG. 2 is a block diagram showing a configuration example of the smart card concerning the embodiment.

Next, a configuration example of the smart card 2 is explained. FIG. 2 is a block diagram schematically showing a configuration example of the smart card 2 concerning the embodiment. The smart card 2 includes a card-like case (a main body) C which is formed by a plastic etc. and a module M. The module M has one or more IC chips Ca and an external interface (communication interface) for communication. The module M is formed in one where the external interface is connected to the IC chip Ca, and the module M is buried in the main body C. Moreover, the module M includes a CPU 21, an NVM 22, an RAM 23, an ROM 24, a communication section 25, an interruption timer 26, etc.

The CPU 21 manages control of the smart card 2 whole. The CPU 21 realizes various functions by operating based on a control program and control data stored in the ROM 24 or the NVM 22. The CPU 21 performs fundamental operation control of the smart card 2 by executing a program of an operating system, for example. Moreover, the CPU 21 performs various kinds of operation control according to an operation form of the smart card 2 by executing an application program according to a purpose of utilization of the smart card 2. In addition, a part of various kinds of functions may be realized by hardware circuit. In this case, the CPU 21 controls a function performed by the hardware circuit.

The NVM 22 is a rewritable non-volatile memory, such as an EEPROM (Electrically Erasable Programmable Read-Only Memory), a flash ROM, etc., for example. A control program or various data according to an operational application of the smart card 2 is written in the NVM 22. Various files according to a standard of the smart card 2 are defined in the NVM 22, and various data is written in those files. A configuration example of the files stored in the NVM 22 is mentioned below.

The RAM 23 is a volatile memory, such as an RAM. The RAM 23 performs as a buffer which stores temporarily data etc. which the CPU 21 is processing. The RAM 23 includes a buffer for reception, a buffer for calculation, a buffer for transmission, etc., for example. The buffer for reception holds a command transmitted from the IC card processing device 1 through the communication section 25. The buffer for calculation holds a temporary result, in order that the CPU 21 may do various calculations. The buffer for transmission holds data to transmit to the smart card processing device 1 through the communication section 25.

Moreover, the RAM 23 has a recording area 23a which stores session key management information, etc. The session key management information is mentioned later.

The ROM 24 is a non-volatile memory. The control program, the control data, etc. which conform to a specification of the smart card 2, are built into the ROM 24 in a manufacturing stage of the IC chip Ca. The control program and the control data manages a fundamental operation of the smart card 2, and conforms to the specification of the smart card 2 concerned.

The communication section 25 is an interface for performing communication with the card reader-writer 14 of the smart card processing device 1. The communication section 25 includes of a contact part which contacts physically and electrically the card reader-writer 14 of the smart card processing device 1, and a communication control part for performing transmission and reception of a signal. For example, when the smart card 2 is a SIM card used for a cellular phone etc., the communication section 25 includes the contact part, and the communication control part which performs transmission and reception of a signal with the cellular phone etc.

The interruption timer 26 is a timer which informs the CPU 21 of a time when interruption processing is performed. The interruption processing means making the CPU 21 suspend the processing under execution compulsorily, and making the CPU perform other processing. That is, when a prescribed time elapses after the interruption timer 26 starts counting time, the interruption timer 26 transmits an interruption start signal which informs a start of the interruption processing to the CPU 21.

The interruption timer 26 has a counter. The interruption timer 26 checks whether a holding period of the session key (a hold time of a session key, or a time clocked by the counter) exceeds a threshold. The interruption timer 26 has a function which makes a counter start counting up based on a command from the CPU 21, a function which transmits the interruption start signal to the CPU 21 when a count value of the counter reaches a prescribed number (a count threshold), etc.

The CPU 21 transmits a count threshold set signal which sets the count threshold to the interruption timer 26, and sets the count threshold to the interruption timer 26, for example. That is, the interruption timer 26 of the smart card 2 includes a second record section which stores a threshold in a claim. After setting up the count threshold, the CPU 21 transmits a command which makes the counter start counting up to the interruption timer 26 at a prescribed timing. The interruption timer 26 makes the counter start counting up according to the command from the CPU 21. That is, the interruption timer 26 makes the counter increment the count value with a predetermined time interval. When the count value of the counter reaches the count threshold, the interruption timer 26 transmits an interruption start signal which notifies the CPU 21 of a start of the interruption processing.

Moreover, the interruption timer 26 has a function which resets the counter based on a command from the CPU 21, a function which makes the counter suspend counting up temporarily based on a command from the CPU 21, a function which makes the counter resume counting up based on a command from the CPU 21, etc.

Furthermore, the interruption timer 26 has a function which disables the interruption timer 26 based on a disable signal from the CPU 21. When the interruption timer 26 is disabled, the interruption timer 26 does not start counting up even when the interruption timer 26 receives the count start signal which makes a counter start counting up from the CPU 21. Moreover, the interruption timer 26 has a function which enables the interruption timer 26 based on an enable signal from the CPU 21. When the interruption timer 26 is enabled, the interruption timer 26 can start counting when the interruption timer 26 receives the count start signal.

When the interruption timer 26 is enabled, the interruption timer 26 starts counting when it receives the count start signal from a CPU 21. Moreover, when the counter of the interruption timer 26 has already started counting, upon receiving the count start signal, the interruption timer 26 resets the counter and starts counting again.

In addition, the interruption timer 26 may be realized by execution of software by the CPU 26.

Figure 3:
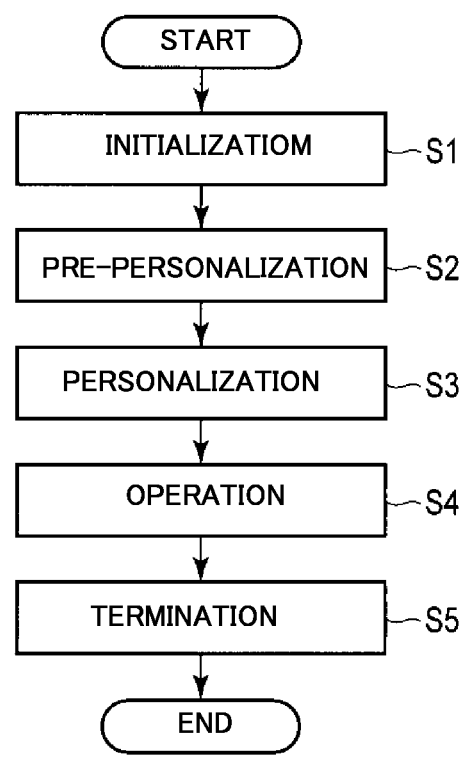
FIG. 3 is a flow chart which shows an example of a life cycle of the smart card concerning the embodiment.

Next, a life cycle of the smart card 2 from initialization to termination is explained. FIG. 3 is a flow chart for explaining the life cycle of the smart card 2. First, the smart card 2 is manufactured by a manufacturing step including burying the module M in the case C etc. As for the smart card 2 immediately after manufacturing, there is no data written in the NVM 22. The manufactured smart card 2 performs initialization processing as an initial issue phase in issue processing. That is, an issue processing device makes the manufactured smart card 2 perform the initialization processing (Step 1). The initialization processing is processing which writes fundamental data, such as an OS etc., a program management table, program codes, etc., in a system area in the NVM 22 of the smart card 2.

The smart card 2 which completed the initialization processing performs pre-personalization as a next issue phase. That is, an issue processing device makes the smart card 2 which completed the initialization processing perform the pre-personalization processing (Step 2). The pre-personalization processing is processing which writes file definition information etc. in a file definition information area in the NVM 22 of the smart card 2, and thereby performs file creation etc.

The smart card 2 which completed the pre-personalization processing performs personalization as a next issue phase. That is, an issue processing device makes the smart card 2 which completed the pre-personalization processing perform the personalization processing (Step 3). The personalization processing is processing which writes file data etc. required for operation of the smart card 2 in a file data area in the NVM of the smart card 2. In the personalization processing, information of the user who uses the smart card 2 at the time of operation, etc. are written in, for example.

As for the smart card 2 which completed the personalization processing, an actual operation is started (Step 4). The smart card 2 which completed the personalization is handed to a user, and the user uses service which the issuer of the smart card 2 provides, for example. The smart card 2 which starts an operation is terminated after use, according to prescribed operation conditions (Step 5). When a supplied service ended, when a prescribed term of validity expired, or when a fault in operation etc. occurred, for example, the smart card 2 is terminated.

In addition, these issue processing devices used in these issue phases may be the same, or may differ mutually. Moreover, the issue processing devices used at Step 1 and Step 2 may be installed in a manufacture factory of the smart card 2, etc. The issue processing device used at Step 3 may be installed in a store etc. which provide the service which uses the smart card 2.

Figure 4:
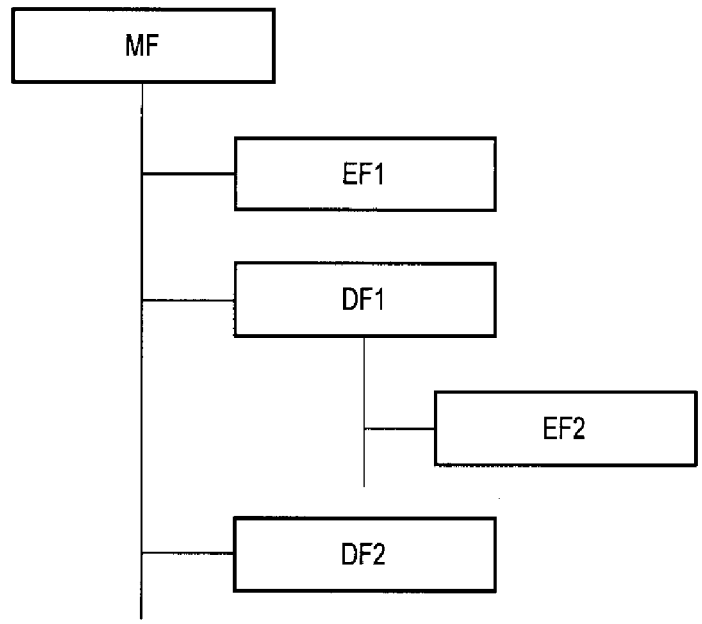
FIG. 4 illustrates an example of a management structure of files stored in an NVM of the smart card concerning the embodiment.

Next, the files stored in the NVM 22 are explained. FIG. 4 illustrates a constructional example of the files stored in the NVM 22. As FIG. 4 shows, in the NVM 22, a plurality of files, such as MF (Master File), DF (Dedicated File) 1 and DF2, EF (Elementary File) 1 and EF2, etc. is defined, and these files have a layered structure.

In a example shown in FIG. 4, DF1 and DF2 exist in a level below MF in the highest level. Data for realizing one application which the smart card 2 possesses is stored in one DF, for example. When the smart card 2 has realized a plurality of functions by a plurality of applications, the NVM 22 may store a plurality of DFs corresponding to each application. Moreover, other DF may exist in a level below DF.

In the example shown in FIG. 4, EF1, DF1 and DF2 exist in a level below MF, and EF2 exists in a level below DF1. EF1 and EF2 are data files for storing various kinds of data. As for EF1 and EF2, data is stored by one data structure selected from prescribed data structures. EF1 and EF2 may be a file in which object data of TLV structure where an identifier (Tag), length information (Length), and a data portion (Value) are connected in order, is stored, or may be a file which stores binary data, for example. In addition, the number of DF and EF stored in the NVM 22 is not limited to the specific number. Moreover, the layered structure of the files stored in the NVM 22 is not limited to a specific structure.

Figure 5:
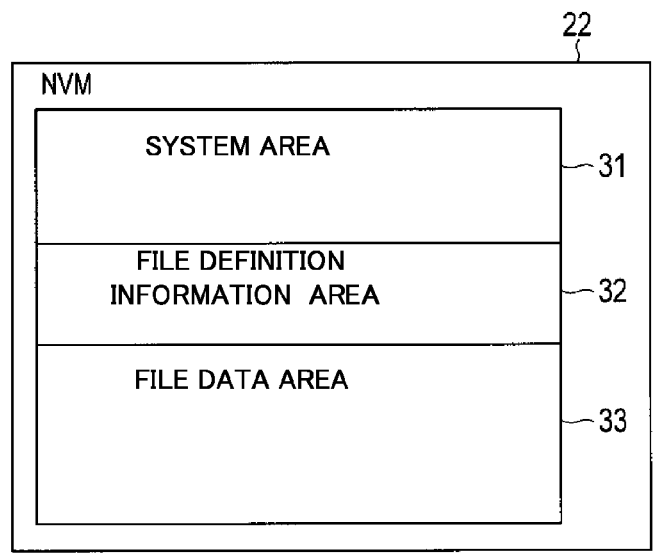
FIG. 5 illustrates a configuration example of the NVM of the smart card concerning the embodiment.

Next, a configuration example of the NVM 22 of the smart card 2 is explained. FIG. 5 illustrates the configuration example of the NVM 22 of the smart card 2. The NVM 22 includes a system area 31, a file definition information area 32, a file data area 33, etc. as FIG. 5 shows.

The system area 31 stores an OS which manages the fundamental operation of the smart card 2, data for controlling the OS, etc. The system area 31 stores fundamental data, such as the OS etc., a program management table, program codes, etc., for example.

The file definition information area 32 stores the file definition information of each file. The file definition information is information which defines the file which the NVM 22 stores. The file definition information is mentioned below. The file data area 33 stores a data area of each file. The data area is real data of a file which the file definition information defines.

In the configuration example shown in FIG. 5, a file is composed of the file definition information which the file definition information area 32 stores, and a data area in the file data area 33 which the file definition information defines. DF is defined by DF definition information which the file definition information area 32 stores, for example. Moreover, EF is composed of EF definition information which the file definition information area 32 stores, and a data area in the file data area 33 which the EF definition information defines.

Figure 6:
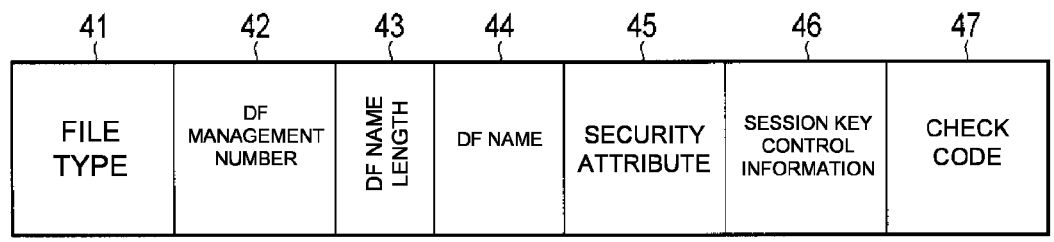
FIG. 6 illustrates a configuration example of DF definition information stored in the NVM of the smart card concerning the embodiment.

Next, the DF definition information is explained. FIG. 6 illustrates a configuration example of the DF definition information which the NVM 22 of the smart card 2 stores. The DF definition information is information which defines DF which the NVM 22 stores.

As shown in FIG. 6, the DF definition information includes a file type 41, a DF management number 42, a DF name length 43, a DF name 44, a security attribute 45, session key control information 46, a check code 47, etc.

The file type 41 shows a form of DF. The DF management number 42 is an identification number peculiar to DF for identifying DF. The DF name length shows a length of the DF name. The DF name is a name for an external device to identify DF when the external device chooses DF. The security attribute 45 is security information to which the CPU 21 refers when performing an application of DF. The session key control information 46 is information which the CPU 21 uses in order to control a session key. The session key control information 46 is mentioned below. The check code 47 is a code for checking whether the DF definition information was read correctly. In addition, the DF definition information may include other elements, and a structure of the DF definition information is not limited to a specific structure.

Next, the session key is explained. The session key is an authentication key required in order that the smart card 2 may execute an application. Namely, before the smart card 2 executes the application, the smart card 2 must generate the session key corresponding to the application, and must store the session key in the RAM 23. The session key may be data produced by the smart card 2 decrypting data produced by the smart card processing device 1 enciphering the authentication key with a secret key, for example. A generation method of the session key is not limited to a specific method.

The session key required in order that the smart card 2 may execute the application differs for every application. That is, the required session keys are beforehand set up for every application, and the smart card 2 needs to generate a session key according to an application to execute.

In addition, mutually different session keys may be set up for all the applications. Moreover, a single session key may be set up for two or more applications. Moreover, the same session key may be set up for all the applications. Furthermore, there may be an application which does not need a session key.

The smart card processing device 1 transmits a session key generation command which makes the smart card 2 generate a session key according to an application executed by a following command to the smart card 2. The smart card 2 generates the session key based on the session key generation command which the smart card processing device 1 transmits.

Figure 7:
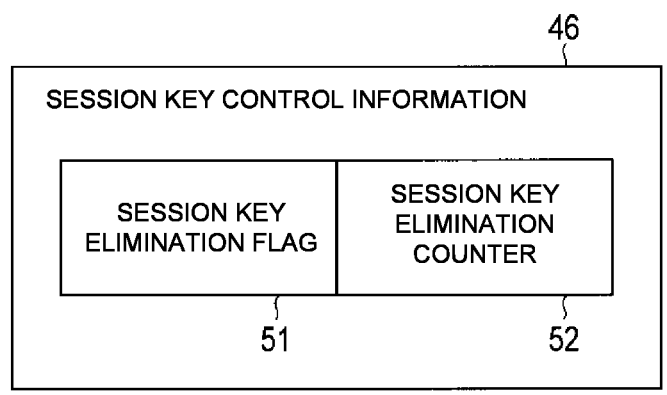
FIG. 7 illustrates a configuration example of session key control information stored in the NVM of the smart card concerning the embodiment.

Next, the session key control information 46 is explained. FIG. 7 illustrates a configuration example of the session key control information 46. The session key control information 46 is the information for controlling the session key as above-mentioned. That is, the session key control information 46 shows whether the smart card 2 erases the session key in accordance with time course, and a time until the smart card 2 erases the session key, etc.

As shown in FIG. 7, the session key control information 46 includes a session key erasure flag 51, a session key erasure counter 52, etc.

The session key erasure flag 51 shows whether the smart card 2 erases a session key by a time course. That is, session key erasure flag 51 shows that the session key is erasable or not. That is, the smart card 2 has a third record section indicated in the claim. When the session key erasure flag 51 shows "erasable", the smart card 2 erases the session key when a prescribed time has passed after generating the session key. When the session key erasure flag 51 shows "not erasable", the smart card 2 holds the session key until the electric power supply from the smart card processing device 1 is lost, or until a command which makes the smart card 2 erase the session key is received.

The session key erasure counter 52 shows a holding time until a session key is erased. A value which the session key erasure counter 52 stores is transferred to the interruption time 26, and is used as the count threshold of the interruption timer 26. As for the session key erasure counter 52, the same value may be set up for a plurality of applications. Moreover, a respectively individual value may be set up for each application. As mentioned above, a setup of the holding time to the session key erasure counter 52 is performed in the pre-personalization or the personalization.

Figure 8:
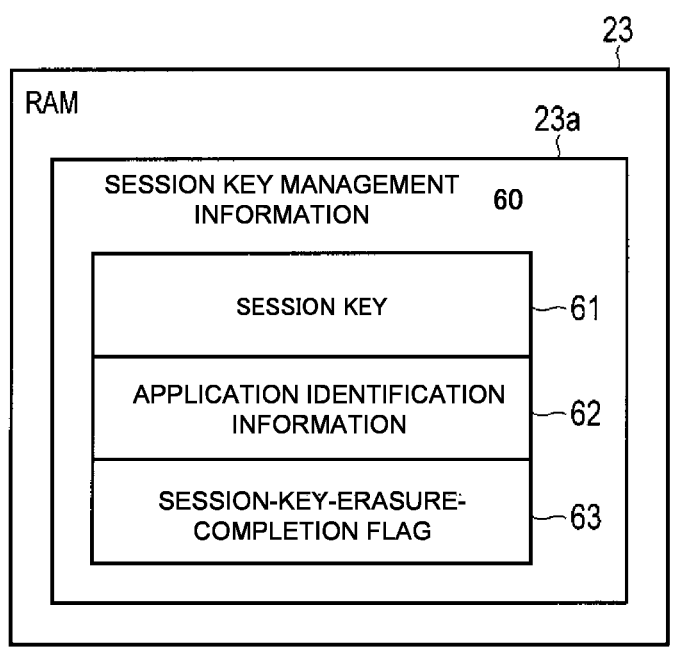
FIG. 8 illustrates a configuration example of session key management information stored in an RAM of the smart card concerning the embodiment.

Next, the session key management information 60 stored in the recording area 23a of the RAM 23 is explained. FIG. 8 illustrates a configuration example of the session key management information 60. The session key management information 60 is information which the smart card 2 needs for control of the session key.

As shown in FIG. 8, the session key management information 60 includes the session key 61, application identification information 62, a session-key-erasure-completion flag 63, etc. The session key 61 is generated based on the session key generation command which the smart card processing device 1 transmitted.

The application identification information 62 stores the information which shows the DF definition information of DF (application) chosen currently. The application identification information 62 may store the DF definition information of DF chosen currently, and may store a head address of area which stores DF definition information, for example. An application of DF which the application identification information 62 shows is an application which needs the session key 61 for execution.

The session-key-erasure-completion flag 63 shows whether the session key 61 was erased. When the session-key-erasure-completion flag 63 is "not yet erased", the session key management information 60 holds the session key 61. When the session-key-erasure-completion flag 63 is "erased", the session key 61 has already erased and the session key management information 60 does not hold the session key 61.

The session-key-erasure-completion flag 63 and the session key 61 are stored simultaneously. That is, at the same time when the CPU 21 stores the session key 61 in the session key management information 60, the CPU 21 stores the information showing the "not yet erased" to the session-key-erasure-completion flag 63 in the session key management information 60.

Figure 13:
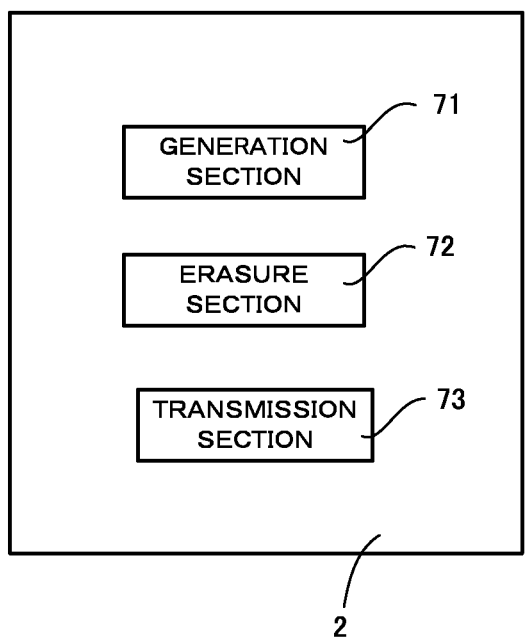
FIG. 13 illustrates functions realized by operation of a CPU in the smart card concerning the embodiment.

Next, various functions realized by operation of the CPU 21 based on the control program and control data which are stored in the ROM 24 or the NVM 22 is explained. As shown in FIG. 13, the smart card 2 includes a generation section 71, an erasure section 72, a transmission section 73, etc. The generation section 71 generates a session key according to a command which requires generation of the session key which the communication section 25 receives. The erasure section 72 erases the session key when a holding period of the session key exceeds a threshold. The transmission section 73 transmits a response which shows that the session key was erased to the external device 1 by the communication section 25 when the communication section 25 receives a command which needs the session key after the erasure section 72 erased the session key.

Figure 9:
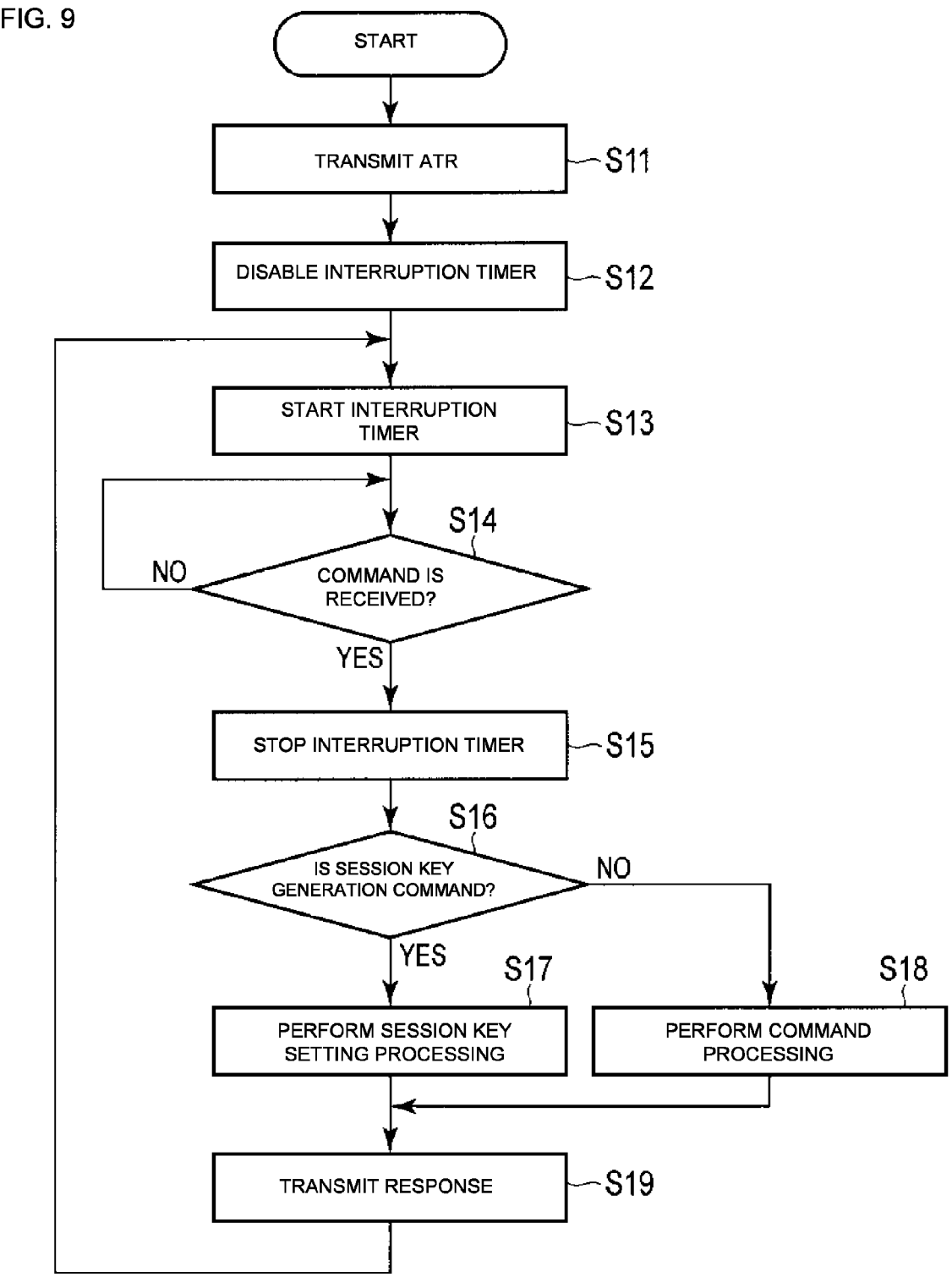
FIG. 9 is a flow chart for explaining an operation example of the smart card concerning the embodiment.

FIG. 9 is a flow chart for explaining an operation example of the smart card 2. First, the CPU 21 of the smart card 2 transmits an initial response (Answer To Reset (ATR)) to the smart card processor 1 (Step 11). The smart card processing device 1 specifies the smart card 2 by the initial response. Moreover, the smart card 2 has chosen DF by a selection command sent from the smart card processing device 1. That is, the smart card 2 has chosen the application.

Upon transmitting the initial response, the CPU 21 transmits the disable signal to the interruption timer 26, and thereby disables the interruption timer 26 (Step 12). Moreover, at the same time, the CPU 21 may reset the counter of interruption timer 26 and the count threshold.

Upon disabling the interruption timer 26, the CPU 21 transmits the count start signal which makes the count start counting to the timer 26 (Step 13).

Upon transmitting the signal which starts counting to the interruption timer 26, the CPU 21 judges whether a command was received from the smart card processing device 1 through the communication section 25 (Step 14). Upon judging that the command has not been received (Step 14, NO), the CPU 21 returns to Step 14 and waits for a command.

Upon judging that the command has been received, the CPU 21 stops the interruption timer 26 (Step 15). That is, the CPU 21 transmits to a signal which stops counting to the interruption timer 26. If the interruption timer 26 has made the counter start counting up, the interruption timer 26 stops counting up when the interruption timer 26 receives the concerned signal. If the counter of the interruption timer 26 has not started counting up yet, the interruption timer 26 does not carry out any operation even when the interruption timer 26 receives the concerned signal.

Upon stopping the interruption timer 26, the CPU 21 judges whether the received command is the session key generation command (Step 16). Upon judging that the received command is the session key generation command (Step 16, YES), the CPU 21 performs the session key setting processing (Step 17). The session key setting processing is mentioned below. In addition, upon judging that the received command is not the session key generation command (Step 16, NO), the CPU 21 performs the command processing (Step 18). The command processing is mentioned below.

When the CPU 21 performed the session key setting processing (Step 17), or when the CPU 21 performed the command processing (Step 18), the CPU 21 transmits a response to the smart card processing device 1 through the communication section 25 (Step 19). That is, when the CPU 21 performed the session key setting processing or the command processing, the CPU 21 transmits the response stored in the buffer for transmission of the RAM 23 to the smart card processing device 1. Upon transmitting the response, the CPU 21 returns to Step 13.

Figure 10:
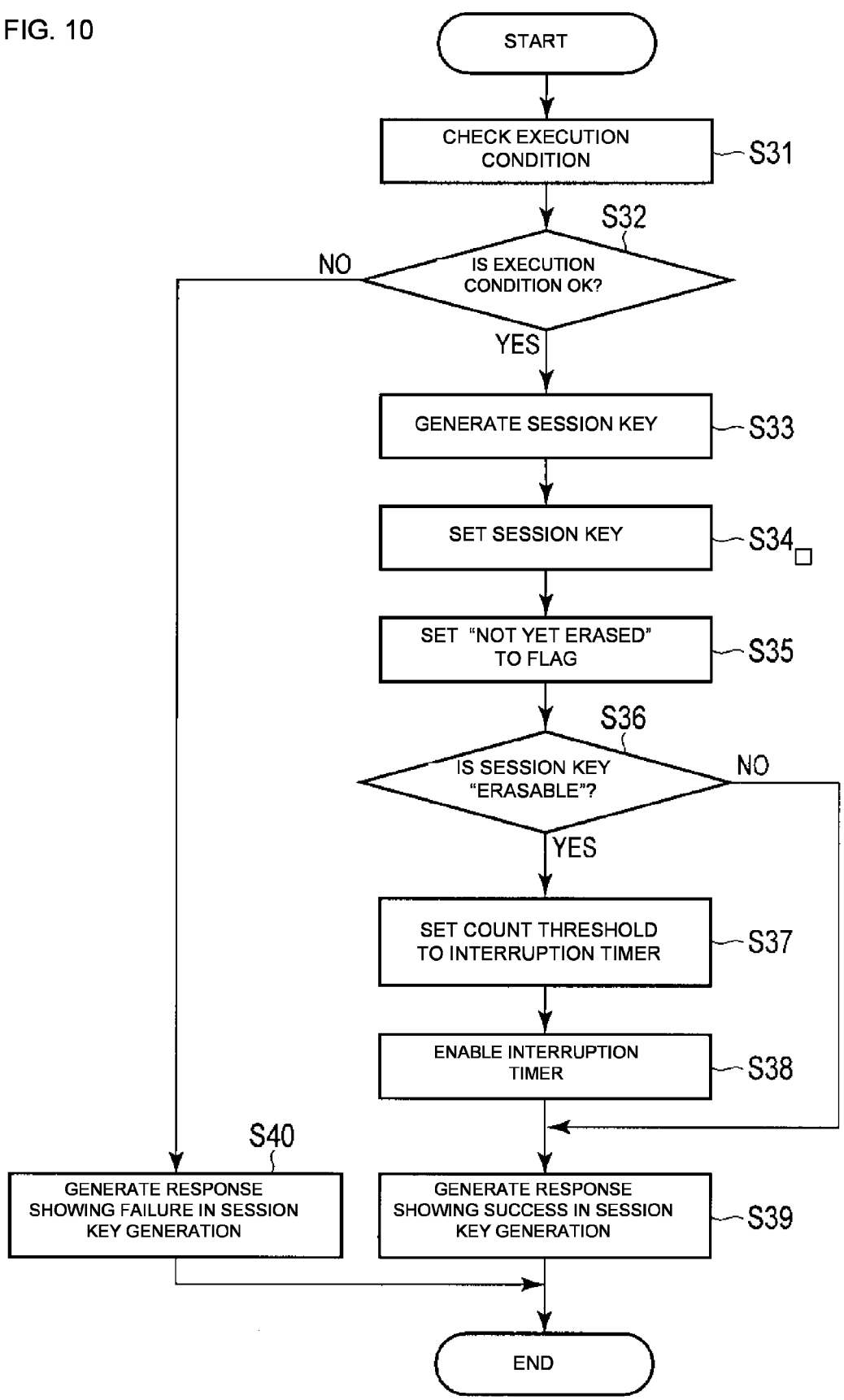
FIG. 10 is a flow chart for explaining an operation example of session key setting process of the smart card concerning the embodiment.

Next, the session key setting processing (Step 17) is explained. FIG. 10 is a flow chart for explaining an operation example when the CPU 21 performs the session key setting processing. First, the CPU 21 checks an execution condition of the session key generation command (Step 31). The CPU 21 checks whether the session key generation command is broken, for example.

Upon judging that the execution condition is fulfilled (Step 32, YES), the CPU 21 generates the session key 61 (Step 33). Upon generating the session key 61, the CPU 21 sets up the generated session key 61 (Step 34). That is, the CPU 21 stores the generated session key 61 in the session key management information 60 in the RAM 23.

Upon setting up the session key, the CPU 21 sets the "not yet erased" to the session-key-erasure-completion flag 63 in the session key management information 60 (Step 35). That is, the CPU 21 stores in the session key management information 60 information showing the "not yet erased" to the session-key-erasure-completion flag 63.

Upon setting the "not yet erased" to the session-key-erasure-completion flag 63, the CPU 21 judges whether the generated session key 61 is a session key that is erased by the time course with reference to the application identification information 62 (Step 36).

In the case where the application identification information 62 stores the DF definition information, the CPU 21 extracts the session key control information 46 from the DF definition information which the application identification information 62 stores, and acquires the session key erasure flag 51. The CPU 21 judges whether the generated session key 61 is a session key that is erased by the time course based on the acquired session key erasure flag 51.

Moreover, in the case where the application identification information 62 stores a head address of the area which stores the DF definition information, the CPU 21 acquires the head address concerned from the application identification information 62, and searches the DF definition information from the NVM 22 based on the acquired head address. The CPU 21 extracts the session key control information 46 from the searched DF definition information, and acquires the session key erasure flag 51. The CPU 21 judges whether the generated session key is a session key that is erased by the time course based on the acquired session key erasure flag 51.

Upon judging that the generated session key 61 is a session key that is erased by the time course (Step 36, YES), the CPU 21 sets the count threshold to the interruption timer 26 (Step 37). That is, the CPU 21 acquires the value of the session key erasure counter 52 from the session key control information 46 extracted at Step 36. The CPU 21 transmits a count threshold set signal that sets the acquired value of the session key erasure counter 52 as the count threshold, to the interruption timer 26.

Upon setting the count threshold to the interruption timer 26, the CPU 21 transmits the enable signal to the interruption timer 26, and thereby enables the interruption timer 26 (Step 38).

When the CPU 21 enables the interruption timer 26 (Step 38), or when the CPU 21 judged that the generated session key 61 is not a session key which is erased by the time course (Step 36, NO), the CPU 21 generates a response which shows success of session key generation, and stores the generated response in the buffer for transmission of the RAM 23 (Step 39).

Moreover, upon judging that the execution condition is not fulfilled (Step 32, NO), the CPU 21 generates a response which shows failure in session key generation, and stores the generated response in the buffer for transmission of the RAM 23 (Step 40).

When the CPU 21 generates the response which shows the success of session key generation (Step 39), or when the CPU 21 generates the response which shows the failure in session key generation (Step 40), the CPU 21 ends session key setting processing (Step 17). And the CPU 21 goes to Step 19 of FIG. 9.

Next, the session key erasure processing is explained. In the case where the interruption timer 26 transmitted the interruption start signal to the CPU 21 because the count value of the counter of the interruption timer 26 reached the count threshold, the CPU 21 starts the session key erasure processing. Upon receiving the interruption start signal, the CPU 21 suspends other processing and starts the session key erasure processing as the interruption processing.

Figure 11:
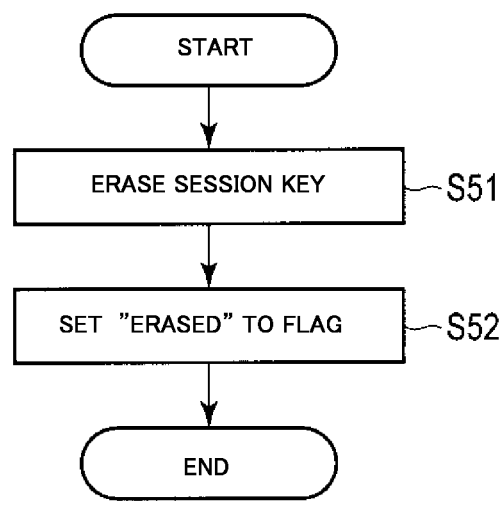
FIG. 11 is a flow chart for explaining an operation example of session key erasing process of the smart card concerning the embodiment.

FIG. 11 is a flow chart for explaining the operation example of the session key erasure processing. First, the CPU 21 erases the session key 61 (Step 51). That is, the CPU 21 erases the session key 61 from the session key management information 60 in the RAM 23.

Upon erasing the session key, the CPU 21 rewrites the session-key-erasure-completion flag 63 within the session key management information 60 from the "not yet erased" to the "erased" (Step 52). Upon rewriting the session-key-erasure-completion flag 63 from the "not yet erased" to the "erased", the CPU 21 ends the session key erasure processing.

In addition, when the CPU 21 receives the interruption start signal while receiving a command, the CPU 21 may execute the command without performing the session key erasure processing. Moreover, when the CPU 21 receives a command while performing the session key erasure processing, the CPU 21 may suspend the session key erasure processing.

Next, an operation example of a command processing (Step 18) other than the session key generation command is explained. The command may be a write-in command, a reading-out command, or a data erasing command, for example. If the command is other than the session key generation command, the command is not limited to a specific command.

Figure 12:
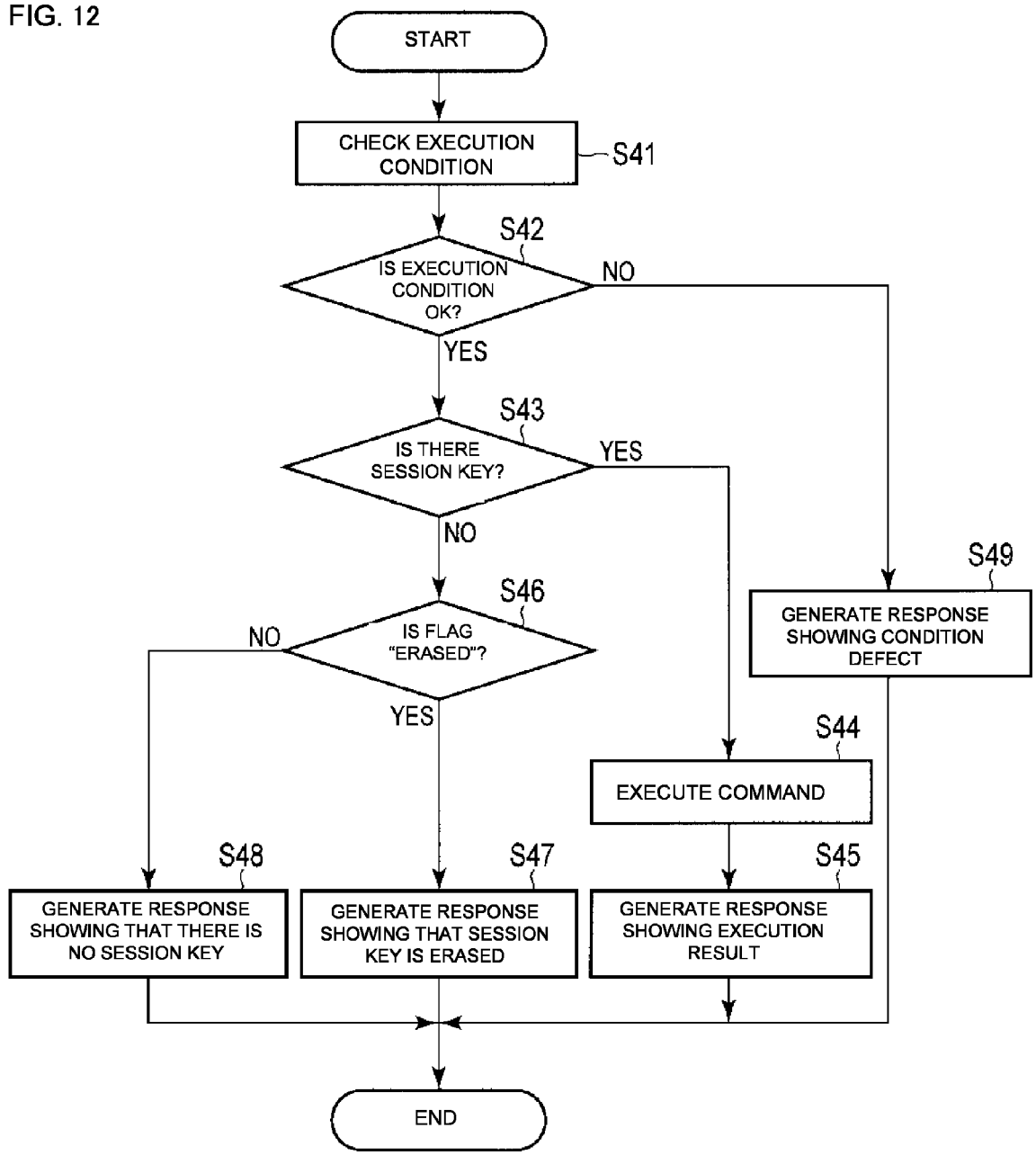
FIG. 12 is a flow chart for explaining an operation example of command execution processing of the smart card concerning the embodiment.

FIG. 12 is a flow chart for explaining an operation example of the command processing other than the session key generation command. First, the CPU 21 checks the execution condition of the command (Step 41). The CPU 21 checks whether the command received is broken, for example.

Upon judging that the execution condition is fulfilled (Step 42, YES), the CPU 21 judges whether there is the session key 61 in the session key management information 60 (Step 43). Upon judging that the execution condition is not fulfilled (Step 42, NO), the CPU 21 generate a response which shows a condition defect (Step 49).

Upon judging that there is the session key 61 (Step 43, YES), the CPU 21 executes the received command (Step 44). Upon executing the received command, the CPU 21 generates a response which shows an executed result and store the generated response in the buffer for transmission (Step 45).

Upon judging that there is no session key 61 (Step 43, NO), the CPU 21 judges whether the session-key-erasure-completion flag 63 is the "erased" or not (Step 46).
That is, the CPU 21 judges whether the information showing the "erased" is stored to the session-key-erasure-completion flag 63 with reference to the session-key-erasure-completion flag 63 of the session key management information 60.

Upon judging that the session-key-erasure-completion flag 63 is the "erased" (Step 46, YES), the CPU 21 generates a response which shows that the session key 61 was erased, and stores the generated response in the buffer for transmission (Step 47).

Upon judging that the session-key-erasure-completion flag 63 is not the "erased" (Step 46, NO), the CPU 21 generates a response which shows that the session key 61 does not exist, and stores the generated response in the buffer for transmission (Step 48). And the CPU 21 goes to Step 19 of FIG. 9.

When the CPU 21 generates the response which shows the executed result (Step 45), when the CPU 21 generates the response which shows that the session key 61 was erased (Step 47), or when the CPU 21 generates the response which shows that the session key 61 does not exist (Step 48), the CPU 21 ends the command processing. The CPU 21 transmits a signal which resets the counter to the interruption timer 26. And the CPU 21 goes to Step 19 of FIG. 9.

In addition, the CPU 21 may transmit the count start signal to the interruption timer 26 immediately after generating the session key 61. Moreover, the CPU 21 may order the interruption timer 26 to make the counter start counting up without resetting the counter of interruption timer 26 after performing the command processing. In this case, the smart card can limit a total time of waiting times for reception of a series of a plurality of commands in one application rather than limits a waiting time for reception of a command. Or the smart card can limit the total time of the time periods among the commands in the one application.

Moreover, the interruption timer 26 may be realized by software. In this case, the CPU 21 counts up the count value. When the count value of the counter reaches the counter threshold, the CPU 21 performs the session key erasure processing. Moreover, when the prescribed time has passed since the generation of session key 61, the CPU 21 may perform the session key erasure processing.

Furthermore, the smart card 2 may communicate with the smart card processing device 1 by a non-contact manner. In this case, the communication section 25 of the smart card 2 may be constituted by a communication control section, such as a modulation and demodulation circuit etc., and an antenna for transmitting and receiving electric waves, in order to perform wireless communications with the card reader-writer 14 of the smart card processing device 1.

The count threshold which the CPU 21 sets to the interruption timer 26 may be specified by a command from the external device. It may be determined by a command from the external device whether the CPU 21 erases the session key by a time course.

When the CPU 21 establishes a plurality of communications channels, or when the CPU 21 chooses a plurality of DFs, the RAM 23 may store a plurality of session key management information 23*a*.

The smart card constituted as mentioned above erases the session key when the predetermined time has passed after generating the session key. As a result, the smart card does not hold the session key for a long time, and thereby the security of the smart card increases. When the smart card is a contact smart card, the smart card can operate for a long time. In this case, it is much more effective in improvement in the security of the smart card to erase the session key by a time course. Moreover, the smart card 2 can continue holding the session key used periodically by resetting the counter of the interruption timer whenever the smart card executes a command. Moreover, a total time of the waiting times of reception of commands can be limited for one application. Or the smart card can limit a total time of the times among the commands, in one application.

While an embodiment has been presented by way of example only, and it is not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A smart card which executes a command from an external device, the smart card comprising:
   a communication section which includes a contact part which contacts physically and electrically with the external device and a communication control part for performing transmission and reception of a signal, and which transmits and receives data with the external device;
   a memory configured to store a program and control data; and
   a CPU configured to execute the program to perform operations comprising:
   generating a session key required for executing an application in the smart card in response to a session key generation command received by the communication section;
   storing the session key in the memory;

erasing the session key stored in the memory when a holding period of the session key exceeds a threshold; and executing a second command which is received by the communication section in response to the second command requiring the session key and the session key being stored in the memory.

2. The smart card according to claim 1, further comprising a timer, wherein the erasing of the session key is performed when a count value of the timer reaches the threshold.

3. The smart card according to claim 1, wherein:
the communication section transmits a response which shows that the session key was erased to the external device when the communication section receives the second command which needs the session key after the erasing of the session key.

4. The smart card according to claim 1, the operations further comprising:
storing the threshold.

5. The smart card according to claim 1, the operations further comprising:
storing information showing whether the session key is erased or not by the erasing for every data accessed using the session key to the memory,
wherein the CPU determines whether the erasing of the session key is performed by a time course based on the information showing whether the session key is erased or the session key not stored in the memory.

6. The smart card according to claim 1, wherein the holding period of the session key is a period of waiting for reception of the second command.

7. The smart card according to claim 1, wherein the holding period of the session key is a period between two consecutive commands.

8. The smart card according to claim 1, wherein the holding period of the session key is a total time of a plurality of waiting times for reception of commands.

9. The smart card according to claim 1, wherein the threshold is a time set up before executing the program.

10. The smart card according to claim 9, wherein the time set up is performed for every application.

11. The smart card according to claim 1, wherein the holding period of the session key is reset when the communication section receives a subsequent command which needs the session key.

12. A smart card which executes a command from an external device, the smart card comprising:
a module which includes:
a communication section which includes a contact part which contacts physically and electrically with the external device and a communication control part for performing transmission and reception of a signal, and which transmits and receives data with the external device;
a memory configured to store a program and control data; and
a CPU configured to execute the program to perform operations comprising:
generating a session key required for executing an application in the module in response to a session key generation command received by the communication section;
storing the session key in the memory;
erasing the session key stored in the memory when a holding period of the session key exceeds a threshold; and
executing a second command which is received by the communication section in response to the second command requiring the session key and the session key being stored in the memory; and
a main body which houses the module.

13. An electronic device which executes a command from an external device, the electronic device, comprising:
a communication section which includes a contact part which contacts physically and electrically with the external device and a communication control part for performing transmission and reception of a signal, and which transmits and receives data with the external device;
a memory configured to store a program and control data;
a CPU configured to execute the program to perform operations comprising:
generating a session key required for executing an application in the electronic device in response to a session key generation command received by the communication section;
storing the session key in the memory;
erasing the session key stored in the memory when a holding period of the session key exceeds a threshold; and
executing a second command which is received by the communication section in response to the second command requiring the session key and the session key being stored in the memory.

14. A portable electronic device which executes a command from an external device, the portable electronic device, comprising:
a communication section which includes a contact part which contacts physically and electrically with the external device and a communication control part for performing transmission and reception of a signal, and which transmits and receives data with the external device;
a memory configured to store a program and control data; and
a CPU configured to execute the program to perform operations comprising:
generating a session key required for executing an application in the portable electronic device in response to a session key generation command received by the communication section;
storing the session key in the memory; and
erasing the session key stored in the memory when a holding period of the session key exceeds a threshold; and
executing a second command which is received by the communication section in response to the second command requiring the session key and the session key being stored in the memory.

* * * * *